United States Patent [19]

Manita et al.

[11] 4,034,996
[45] July 12, 1977

[54] BALL JOINT FOR TORQUE ROD

[75] Inventors: Takeyoshi Manita, Kawagoe; Ichiro Seimiya, Yono; Kio Otani; Tadasuke Furutani, both of Ohmiya; Saburo Sasakura, Tokyo, all of Japan

[73] Assignee: Saitamakiki Co., Ltd., Japan

[21] Appl. No.: 620,708

[22] Filed: Oct. 8, 1975

[51] Int. Cl.² .................................... F16C 11/06
[52] U.S. Cl. ..................... 280/80 R; 308/72; 403/140; 403/228
[58] Field of Search .......... 403/134, 135, 139, 140, 403/133, 225, 228; 280/80; 408/72

[56] References Cited

U.S. PATENT DOCUMENTS

| | | | |
|---|---|---|---|
| 1,883,882 | 10/1932 | Davis | 403/139 |
| 1,978,940 | 10/1934 | Guy | 403/228 |
| 3,125,364 | 3/1964 | Springer | 403/140 |
| 3,273,924 | 10/1966 | Maxeiner | 403/140 |
| 3,383,129 | 5/1968 | Ulderup | 403/139 |
| 3,451,700 | 6/1969 | Smith | 403/140 |

FOREIGN PATENT DOCUMENTS

| | | | |
|---|---|---|---|
| 639,352 | 4/1962 | Canada | 403/228 |
| 721,543 | 11/1965 | Canada | 403/134 |
| 1,431,222 | 1/1966 | France | 403/132 |
| 1,187,187 | 4/1970 | United Kingdom | 403/140 |

Primary Examiner—Joseph F. Peters, Jr.
Assistant Examiner—J. D. Rubenstein
Attorney, Agent, or Firm—Fidelman, Wolffe & Waldron

[57] ABSTRACT

This invention relates to a ball joint to use without supplying oil in a torque rod of an automobile, in a mechanism for connecting brackets fitted to the chassis of an automobile, brackets fitted to a wheel axle supporting member and torque rods connecting the said brackets, in which a spherical bearing ring made of strong synthetic resin, for example an acetal resin such as Delrin or the like is provided inside a bearing housing to support a shaft having a spherical ball portion fixed to the said bracket adhering onto the central periphery of the said ball portion, oil-containing fabrics are provided on the both sides of the said spherical bearing ring adhering onto the periphery of the said ball portion, and the said bearing housing is connected to a boss of the torque rod.

9 Claims, 4 Drawing Figures

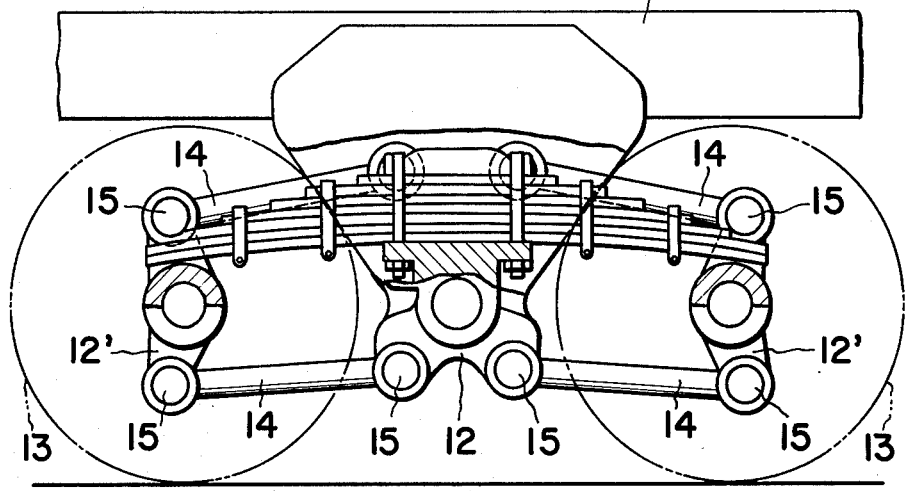
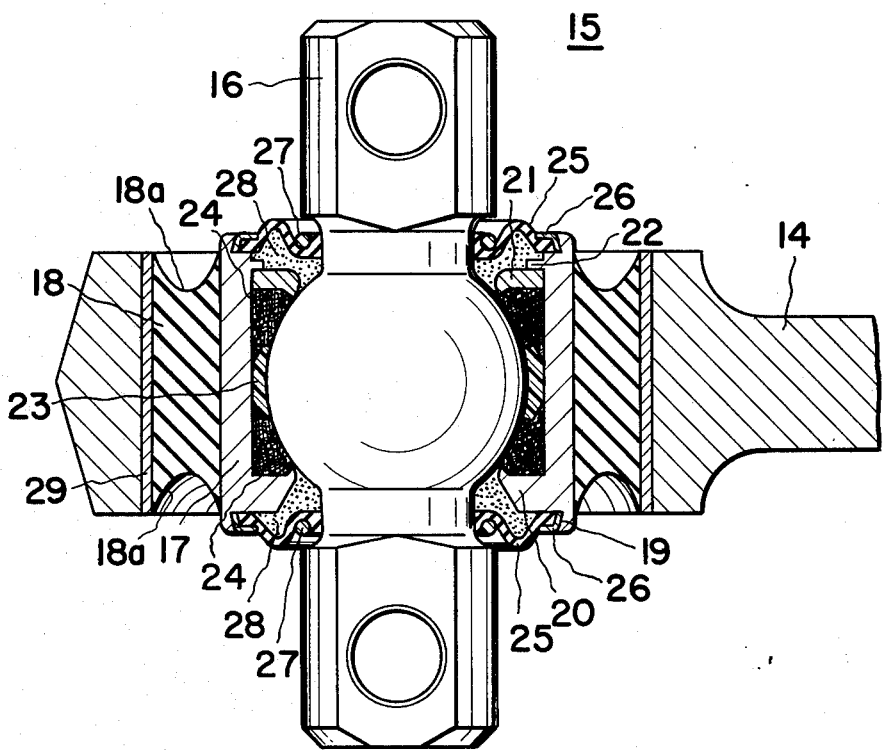

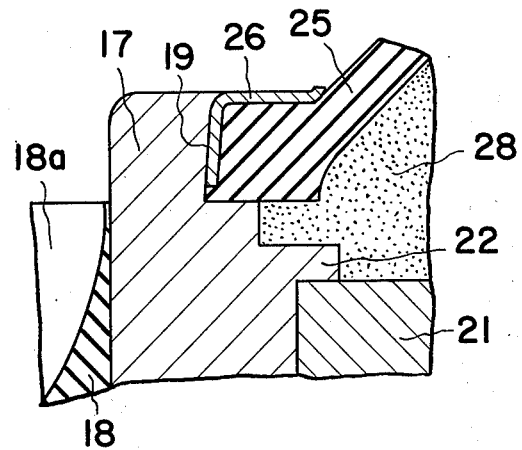
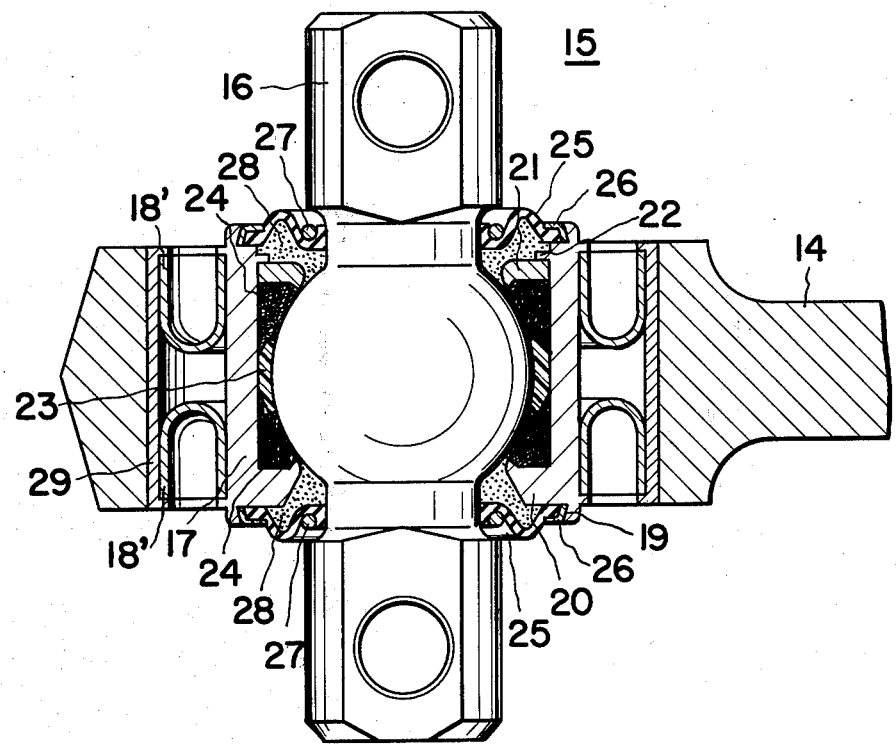

BALL JOINT FOR TORQUE ROD

SUMMARY OF THE INVENTION

This invention relates to a ball joint to use without supplying oil in a torque rod of an automobile.

Heretofore, a ball joint has generally been used for a torque rod interposed between a wheel axle of a heavy vehicle having a double-axle rear wheel arrangement and a chassis thereof thereby to automatically adjust to the movement of the wheel axle relative to the chassis while the vehicle is running on rough or uneven roads. A ball joint in a torque rod should be simple in its construction so as to be easily produced, and it should be smoothly operated and be capable of being used for a long period of time without being supplied with any further oil, and further its life should be semipermanent.

The first object of the present invention is to provide a ball joint which can satisfy the above requirements.

When a strong impulsive force is instantaneously imparted to wheels, wheel axles and torque rods e.g. at the time of braking, a conventional ball joint takes the complete shock, and the shock acts directly on a shaft having a spherical ball portion and a bearing metal. This results in damage or a large degree of wear on the ball portion of the shaft, the bearing metal and/or torque rod, and also damage to the bracket.

The second object of the present invention is to eliminate the above defects by interposing an elastic band made of a strong elastic substance such as rubber or synthetic resin between a bearing housing and a torque rod.

The load given to the elastic band by the abovementioned impulsive force is extremely large in comparison with the ordinary vibrating load of anti-vibration rubber. Therefore the deformation induced by the load in this case is remarkably large. Accordingly, when an elastic band of conventional shape is used, the exposed surfaces of the band swell due to the load compression and rub with the housing portion to cause damage to the ball joint.

The third object of the present invention is to eliminate the above drawbacks by forming the exposed surfaces of the elastic band into a parabolic shape, i.e. a deeply recessed shape.

The other objects and the feature of the present invention will be apparent by a few examples embodying the present invention described with reference to the accompanying drawings.

BRIEF DESCRIPTION OF THE DRAWINGS

FIG. 1 is a side elevation showing part of an automobile rear double axle arrangement including ball joint and torque rod arrangements;

FIG. 2 is a cross-sectional elevation of a ball joint showing the first example embodying the present invention;

FIG. 3 is a diagram, on an enlarged scale, showing a part of the ball joint shown in FIG. 2; and FIG. 4 is a cross-sectional elevation of a ball joint showing the second example embodying the present invention.

DETAILED DESCRIPTION OF THE INVENTION

The first embodiment of the present invention will be described hereinafter referring to the accompanying drawings. FIG. 1 shows part of a rear double axle arrangement of a heavy automobile. Reference numeral 11 designates a chassis of the automobile, 12 and 12' designate brackets respectively fitted to the chassis 11 and wheel axles, and 13 designates wheels supported by torque rods 14 connected to the brackets 12'. Reference numeral 15 designates ball joints respectively provided at positions where the torque rods 14 are connected to the bracket 12 or the wheels 13.

The ball joint 15 is constructed as shown in FIG. 2. Reference numeral 16 designates a shaft having a spherical ball portion and 17 designates a bearing housing surrounded by an elastic band 18 of rubber or the like. The bearing housing 17 has dovetail grooves 19 at both openings and a guide wall 20 at the inner part of one dovetail groove 19. Reference numeral 21 designates a check ring provided on the opposite side to the guide wall 20. The check ring 21 is pressed by several projections 22 provided at regular intervals at the inner part of another dovetail groove 19 after a bearing ring which will be described later is put inside the bearing housing 17.

Reference numeral 23 designates a spherical bearing ring made of strong synthetic resin such as Delrin or the like. The bearing ring 23 is cut rectangularly in part. The bearing ring 23 is positioned at the inner central part of the bearing housing 17 and adhered to the central periphery of the ball portion of the shaft 16 so as to support the shaft 16 in the freely rotatable manner in any direction. Reference numeral 24 designates oil-containing fabrics (cotton or the like). The oil-containing fabrics 24 are provided on the both sides of the bearing ring 23 contacting with the ball portion of the shaft 16. The fabrics 24 have a function of a bearing. Reference numeral 25 designates a flexible dust cover of ring-plate shape made of rubber or the like. Each dust cover 25 is provided with a steel cover support ring 26 having an L-shaped cross-section and being fused or bonded to the outer periphery of the dust cover 25.

The diameter of the dust cover 25 is a little smaller than that of the opening of the bearing housing 17, and the dust cover 25 are mounted into the both dovetail grooves 19 of the bearing housing 17. Namely, as shown in FIG. 3, the outer peripheries of the dust covers 25 are sinked into the both openings of the bearing housing 17, and the cover support rings 26 are put into the dovetail grooves 19, and thereafter the side surfaces of the cover support rings 26 are driven to cause the deformation so that the rings 26 can be firmly fixed in the dovetail grooves 19. The inner peripheries of the dust covers 25 are fastened onto periphery of the shaft 16 by its elasticity and fixed by garter springs 27.

Reference numeral 28 designates lubricant such as grease or the like filled inside the both dust covers 25. Reference numeral 29 designates a cylindrical shell made of steel fixed to the outer periphery of the elastic band 18. The shell 29 is connected to one end of the torque rod 14.

As mentioned hereinbefore, the spherical bearing ring 23 which directly receives the ball portion for the shaft 16 is made from strong synthetic resin such as Delrin or the like. Thus the durability of the ball joint of the present invention is larger than that of a conventional metal-made bearing. Moreover oil-containing fabrics 24 are provided on the both sides of the bearing metal 23, the lubricant 28 such as grease or the like is filled outside the fabrics 24, and the lubricant is held in the housing by the dust covers 25. Accordingly, the smooth rotation of the ball portion of the shaft 16 in the bearing ring 23 can be retained for a long period of time without supplying oil, and the ingress of water and dust and the leakage of lubricant are discouraged by the dust covers 25 mounted on the both openings of the bearing housing 17.

Even if dust or the like enters inside the dust cover, it will be absorbed by the lubricant or the oil-containing fabrics and will not reach the bearing ring 23. Hence no damage will be caused to the contacting surface of the ball portion of the shaft 16 and the bearing ring 23, and it is possible to extremely improve the durability of an anti-vibration ball joint as well as the bearing ring 23 in comparison with a conventional ball joint.

In the first embodiment of the present invention as shown in FIG. 2, a layer of the elastic band 18 made of rubber or the like has grooves 18a on both sides. The groove 18a has a parabolic cross-section, i.e. the bottom of the groove has a circular arc of smaller diameter and the edge of the groove has a circular arc of larger diameter. The elastic band 18 is fixed between the outer periphery of the bearing housing 17 and the inner periphery of the cylindrical shell 29 by fusion or bonding completely covering them.

The elastic band 18 absorbs the impulsive force respectively transmitted from wheels 13 and a chassis 11 to torque rods 14 through brackets 12 and 12'. Therefore the impulsive force is not directly applied to the spherical bearing ring 23 and the shaft 16, and thereby any damage or any wear thereof can be prevented and the life of the ball joint can be prolonged.

When strong impulsive force is transmitted to the bearing housing 17 or the cylindrical shell 29, even if one side of the elastic band 18 is compressed by the impulsive force, since the elastic band 18 has its exposed surfaces deeply recessed, the exposed surface of the band 18 does not protrude beyond the edge, and although rubber is weak to compressive force, any crack is not caused. On the other hand the opposite side of the elastic band 18 receives tension force. However, since rubber is strong to tension force and the side surface is parabolically recessed, excessive stress is prevented from being given to a part.

FIG. 4 shows the second embodiment of the present invention. The same references as shown in FIG. 2 designate the same parts.

In the second embodiment, the elastic band 18 made of rubber or strong synthetic resin in the first embodiment is replaced by two plate springs 18' made of steel or the like. The plate spring 18' has a U-shaped cross-section or other shape which can change elastically, so that any part of the spring 18' does not protrude beyond the edge. A cylindrical shell 29 is press-fitted and fixed in a boss of a torque rod 14. However it is needless to say that the shell 29 may be omitted and the plate spring 18' can be directly press-fitted in the boss of the torque rod 14.

The plate spring 18' absorbs impulsive force given to a ball joint. Differently from rubber its elasticity is not decreased and it is not worn. Further it is superior in heat-resisting property and it makes the manufacture of ball joints easier, and thereby it contributes to the decrease of the cost of a ball joint.

In the foregoing, the present invention has been explained with reference to a few examples. However in the present invention other examples are possible. It should be understood that a number of modifications may be possible without departing from the scope of the present invention as defined in the appended claims.

We claim:

1. A shock absorbing wall joint in a torque rod for use in a heavy vehicle having a double-axle rear wheel arrangement, comprising;
    a shaft having a spherical ball portion enclosed in a bearing housing having end openings and supported by brackets of the vehicle;
    a spherical bearing ring of rigid, low friction material disposed in said bearing housing and adhered to the equatorial part of said ball portion;
    oil-containing fabrics disposed on both sides of said bearing ring within said bearing housing;
    a check ring and a guide wall holding therebetween said spherical bearing ring and said oil-containing fabrics within said bearing housing;
    a pair of flexible dust covers encircling said shaft one on each side of said ball portion, the inner peripheries of said covers sliding on the outer peripheries of said shaft by their compression, and the outer peripheries of said dust covers fixed into the end openings of said bearing housing by means of cover support rings fused or bonded to the outer peripheries of said dust covers;
    lubricant filling said bearing housing around said ball portion, and retained therein by said dust covers; and
    an elastic band interposed between the outer periphery of said bearing housing and the inner periphery of a cylindrical shell, said cylindrical shell being fitted into one end of said torque rod, and forming a unitary construction together with said elastic band and said bearing housing.

2. The ball joint of claim 1 wherein said elastic band has its exposed side surfaces formed in a deeply recessed parabolic shape.

3. The ball joint of claim 2, wherein the depth of said recess of said elastic band is more than half of its thickness.

4. The ball joint of claim 1, in which said elastic band is formed of rubber.

5. The ball joint of claim 1, wherein said elastic band is fused or bonded to the outer periphery of said bearing housing and to the inner periphery of said cylindrical shell.

6. The ball joint of claim 1, wherein said dust covers are made from a resilient material.

7. The ball joint of claim 1 further comprising a spring forcing said inner peripheries of said flexible dust covers against said outer peripheries of said shaft.

8. The ball joint of claim 1 wherein said bearing ring is fabricated of synthetic resin.

9. The ball joint of claim 1 wherein said bearing ring is fabricated of an acetal resin.

* * * * *